United States Patent [19]

von Seyerl

[11] Patent Number: 4,705,842

[45] Date of Patent: Nov. 10, 1987

[54] PROCESS FOR HARDENING EPOXIDE RESIN MASSES AND A HARDENER SOLUTION THEREFOR

[75] Inventor: Joachim von Seyerl, Seeon, Fed. Rep. of Germany

[73] Assignee: SKW Trostberg Aktiengesellschaft, Trostberg, Fed. Rep. of Germany

[21] Appl. No.: 842,478

[22] Filed: Mar. 21, 1986

[30] Foreign Application Priority Data

Mar. 26, 1985 [DE] Fed. Rep. of Germany ....... 3510952

[51] Int. Cl.$^4$ ............................................. C08G 59/56
[52] U.S. Cl. ..................................... 528/88; 528/119; 528/120; 528/123; 528/407; 252/182
[58] Field of Search ................. 528/88, 119, 120, 123, 528/407; 252/182

[56] References Cited

U.S. PATENT DOCUMENTS

| | | |
|---|---|---|
| 2,637,715 | 5/1953 | Ott . |
| 3,391,113 | 7/1968 | Lopez . |
| 4,032,358 | 6/1977 | Hussain ............................ 528/123 X |
| 4,140,658 | 2/1979 | Seltzer ............................. 528/123 X |
| 4,168,364 | 9/1979 | Seltzer et al. ..................... 528/121 X |
| 4,202,920 | 5/1980 | Renner et al. .................... 528/119 X |
| 4,384,084 | 5/1983 | Lohse et al. ..................... 528/116 X |
| 4,414,377 | 11/1983 | Andrews .......................... 528/123 X |
| 4,435,549 | 3/1984 | Lin ................................... 528/119 X |

FOREIGN PATENT DOCUMENTS

| | | |
|---|---|---|
| 216606 | 10/1974 | Fed. Rep. of Germany . |
| 133955 | 1/1979 | Fed. Rep. of Germany . |
| 2743015 | 4/1979 | Fed. Rep. of Germany . |
| 3026706 | 2/1981 | Fed. Rep. of Germany . |

OTHER PUBLICATIONS

Gilbert et al., "Cure of Epoxies by Dicyandiamide and Cyanamide", Polymer Preprints (A.C.S. Div. Poly. Chem.) 25(2), 203-4 (1984).

*Primary Examiner*—Earl Nielsen
*Attorney, Agent, or Firm*—Felfe & Lynch

[57] ABSTRACT

The present invention provides a process for hardening epoxide resin masses, wherein there is added a solution of dicyandiamide and cyanamide in a weight ratio of from 0 to 10:1 in at least one organic solvent.

The present invention also provides a hardener solution for epoxide resin masses, consisting of dicyandiamide and cyanamide in a weight ratio of 0 to 10:1 and at least one organic solvent.

17 Claims, No Drawings

PROCESS FOR HARDENING EPOXIDE RESIN MASSES AND A HARDENER SOLUTION THEREFOR

The present invention is concerned with a process for hardening epoxide resin masses and with a hardener solution suitable herefor.

Because of their outstanding properties, such as high impact strength and resistance to wear, excellent adhesion to most work materials, as well as good light, water and chemical stability, epoxide resins possess numerous possibilities of use and are used, inter alia, as lacquer resins, casting resins and binding agents for printed circuits, as well as for adhesives and reinforced synthetic resins.

Epoxide resin mixtures are also produced for the manufacture of glass fibre-reinforced laminates, these mixtures consisting, as a rule, of a conventional epoxide resin or epoxide resin mixture, a hardener and possibly a hardening accelerator, as well as a certain amount of a solvent or of a solvent mixture for the adjustment of a particular viscosity. From Federal Republic of Germany Patent Specifications Nos. 21 66 606 and 27 43 015, it is known to use cyanamide as hardener in solvent-free or water-containing systems but not in water-free hardener solutions.

As is known, for this case, dicyandiamide is used as hardener (cf., for example U.S. Pat. Nos. 2,637,715 and 3,391,113), which can possibly also contain hardening accelerators, for example dimethylbenzylamine, 2-methylimidazole or tetraalkylguanidines.

The solvent or solvent mixture, which serves the purpose of completely dissolving all the components of the epoxide resin mixture in order thus to achieve a homogeneous distribution on the fabric to be impregnated, as well as a uniform hardening of the impregnated fabric, consists, according to German Democratic Republic Patent Specification No. 133,955, of glycol ethers, for example methyl or ethyl glycol, which, according to Federal Republic of Germany Patent Specification No. 30 26 706, can also contain other solvents, for example aromatic hydrocarbons, alkyl formamides or ketones. One of the main disadvantages in the case of the use of dicyandiamide as hardener in a liquid epoxide resin mixture is its poor solubility in the epoxide resin. This is usually improved by the use of those solvents which dissolve dicyandiamide to such a high degree that even by the addition of the epoxide resin in the production of the resin-hardener-solvent mixture, the dicyandiamide does not crystallise out of the solution. Because of the boiling range limited for reasons of working up, for this purpose as solvent there are essentially considered monomethyl glycol ether or dimethylformamide. However, for various reasons, the use of these solvents, with which also only limited resin concentrations of the resin-hardener-solvent mixture can be achieved, is not without argument.

Therefore, it is an object of the present invention to provide a hardener solution for epoxide resin masses which does not display the mentioned disadvantages of the prior art but rather possesses an especially good solubility in the epoxide resin and a good compatibility with the epoxide resin.

Thus, according to the present invention, there is provided a hardener solution for epoxide resin masses, consisting of cyanamide alone or in admixture with dicyandiamide up to a weight ratio of 1:10 and at least one organic solvent.

Surprisingly, we have found that cyanamide can be used instead of dicyandiamide in hardener solutions without the appearance of any disadvantages with regard to the compatibility with the epoxide resin.

Furthermore, we have ascertained that, in the case of the use of a mixture of dicyandiamide and cyanamide up to a weight ratio of 10:1, the solubility of dicyandiamide in the hardener solutions and epoxide resin-hardener solution mixture is increased. This has the advantage that solvents can also be used which hitherto could not be employed because of their too low dissolving ability with regard to dicyandiamide.

As a further surprising effect, we have found that the combination of dicyandiamide and cyanamide acts synergistically with regard to the rate of hardening of epoxide resins. Due to this synergism, which manifests itself in the case of the amount of hardener remaining the same but also in other weight ratios of dicyandiamide and cyanamide in an optimum gel time, for example for a desired gel time with regard to dicyandiamide, the amount of hardener or the possibly used amount of a conventional hardening accelerator can be reduced.

The weight ratio of dicyandiamide to cyanamide can be varied within wide limits but the ratio of dicyandiamide to cyanamide should not be greater than 10:1 since otherwise the favourable dissolving properties of the mixture are lost not only in the hardener solution but also in the epoxide resin.

The preferred mixing ratio of dicyandiamide to cyanamide is from 0.1:10 to 10:1 and especially from 3:7 to 8:2.

Organic solvents for the hardener solutions used according to the present invention can easily be selected by a few simple preliminary experiments from the large number of available products. For working up technical reasons, there have proved to be useful monomethyl glycol ether, 1-methoxypropan-2-ol, dimethylformamide, acetone, methyl ethyl ketone or mixtures thereof so that these solvents are preferred. The amount of solvent or solvent mixture is preferably so chosen that the content of cyanamide or of dicyandiamide and cyanamide (solids content) is from 5 to 30% by weight. There can possibly also be added one or more conventional hardening accelerators, for example dimethylbenzylamine, in amounts of from 1 to 10% by weight and preferably of from 2 to 5% by weight, referred to the solids content of the hardener solution.

The hardener solution used according to the present invention, which is stable for several weeks, is outstandingly suitable for the production of working-up stable epoxide resin solutions which usually have an epoxide content of from 40 to 60% by weight and are preferably used for the impregnation of fibre-reinforced fabrics. As epoxide resin, there can be used all conventional, commercially available types. Thus, for example, epoxide resins can be used which are commercially available under the designations Epikote 828 or Araldit LZ 7065 N-75 SP.

The hardener solution is added to the epoxide resin, which can possibly already be dissolved in an appropriate solvent, in such an amount that the solids content of the hardener solution is 1 to 10% by weight, referred to the epoxide resin content. Under these conditions, even after several days, no crystallising out of solids or a change of the viscosity occurs. Instead of the addition of the final hardener solution, it is also possible to add the individual components of the hardener solution according to the present invention, i.e. cyanamide or dicyandiamide and cyanamide, solvent and possibly accelerator, to the epoxide resin or to a solution thereof, i.e. to produce the solution in situ, without a crystallisation of the hardener being observed.

The hardening of the epoxide resin masses mixed with the hardener solution according to the present invention preferably takes place in two steps. In the first step, at 80° to 160° C., with evaporation of the main amount of the solvent, there is achieved a non-sticky, so called B stage. In the second step, the resin is then hardened at a temperature of from 140° to 200° C. in a time of from 20 to 60 minutes. The following Examples are given for the purpose of illustrating the present invention:

EXAMPLE 1

(a) The following hardener solutions were prepared with a solids content of 10% by weight, monomethyl glycol ether being used as solvent:

hardener solution A:
 90 parts by weight MG,
 10 parts by weight DCD.
hardener solution B:
 90 parts by weight MG,
 8 parts by weight DCD,
 2 parts by weight anhydrous cyanamide.
hardener solution C:
 90 parts by weight MG,
 5 parts by weight DCD,
 5 parts by weight anhydrous cyanamide.
hardener solution D:
 90 parts by weight MG,
 2 parts by weight DCD,
 8 parts by weight anydrous cyanamide.
hardener solution E:
 90 parts by weight MG,
 10 parts by weight anhydrous cyanamide.
MG=monomethyl glycol ether.
DCD=dicyandiamide.

(b) The solutions, which were clear at ambient temperature, were stored for 3 weeks at 40° C. An analytical testing of the cyanamide content showed no decomposition of the cyanamide.

(c) Epoxide resin masses were produced with the use of the epoxide resin Araldit LZ 7065-75-SP (13.3 g.), hardener solution according to A) (3 g.) and methyl glycol ether (1 g.).

During the course of storage for 4 days at ambient temperature, the viscosity of the clearly dissolved mixtures did not change.

At 180° C., there were obtained the following gel times for the individual resin hardener solutions:
A: 300 seconds.
B: 240 seconds.
C: 205 seconds.
D: 210 seconds.
E: 240 seconds.

EXAMPLE 2

(a) The following hardener solutions were prepared with a 10% by weight solids content, using 1-methoxypropan-2-ol as solvent:
hardener solution F:
 90 parts by weight MP,
 5 parts by weight DCD,
 5 parts by weight anhydrous cyanamide.
hardener solution G:
 90 parts by weight MP,
 3 parts by weight DCD,
 7 parts by weight anhydrous cyanamide.
hardener solution H:
 90 parts by weight MP,
 10 parts by weight anhydrous cyanamide.
MP=1-methoxypropan-2-ol.
DCD=dicyandiamide.

(b) The solutions, which were clear at ambient temperature, were storage-stable with regard to decomposition for 3 weeks.

(c) Epoxide resin masses were produced analogously to Example 1 (c) with the use of 1-methoxypropan-2-ol as solvent. The resin-hardener solutions were storage-stable for more than 4 days and gave the following gel times at 180° C.:
F: 290 seconds.
G: 270 seconds.
H: 285 seconds.

I claim:

1. A process for hardening epoxide resin masses, comprising adding to the resin, a hardener solution of dicyandiamide and cyanamide in a weight ratio of from 0 to 10:1 in an organic solvent selected from the group consisting of monomethyl glycol ether, 1-methoxypropan-2-ol, dimethylformamide, acetone, methyl ethyl ketone and a combination of two or more thereof.

2. The process of claim 1, wherein the solution has a solids content of from 5 to 30% by weight.

3. The process of claim 1, wherein the weight ratio of dicyandiamide to cyanamide is from 3:7 to 8:2.

4. The process of claim 1 wherein 1 to 10% by weight of a hardening accelerator, referred to the solids content, is added to the solution.

5. The process of claim 4, wherein 2 to 5% by weight of the hardening accelerator is added to the solution.

6. The process of claim 1 wherein the hardener solution is added in an amount which introduces 1 to 10% by weight solids content, referred to the epoxide resin content.

7. The process of claim 1 wherein the hardener solution is produced in situ in the epoxide resin or epoxide resin solution by the individual addition of dicyandiamide, cyanamide and solvent to the resin.

8. The process of claim 1 further comprising; heating the mixture of epoxide resin and hardener solution in a first step to a temperature of from 80° to 160° C. to evaporate the main amount of the solvent and then heating in a second step to a temperature of from 140 to 200° C. to accelerate the hardening.

9. A hardener solution for epoxide resin masses, consisting of a mixture of dicyandiamide and cyanamide in a weight ratio of 0 to 10:1 and at least one organic solvent or said mixture and from 1 to 10% by weight referred to the solids content, of a hardening accelerator; said organic solvent being selected from the group consisting of monomethyl glycol ether, 1-methoxypropan-2-ol, dimethylformamide, acetone and methyl ethyl ketone.

10. The hardener solution of claim 9, wherein the solution has a solids content of 5 to 30% by weight.

11. The hardener solution of claim 9, wherein the weight ratio of dicyandiamide to cyanamide is from 3:7 to 8:2.

12. The hardener solution of claim 9, wherein it contains the hardening accelerator in an amount of from 1 to 10% by weight, referred to the solids content.

13. The hardener solution of claim 12, wherein it contains the hardening accelerator in an amount of from 2 to 5% by weight, referred to the solids content.

14. A process for hardening epoxide resin masses comprising adding to the resin, a hardener solution consisting of dicyandiamide and cyanamide in a weight ratio of from 0 to 10:1 or said weight ratio of dicyandiamide and cyanamide and 1 to 10% by weight referred to the solids content, of a hardening accelerator, in an organic solvent selected from the group consisting of monomethyl glycol ether, 1-methoxypropan-2-ol, dimethylformamide, acetone, methyl ethyl ketone and a mixture of two or more thereof.

15. The process of claim 14 wherein the weight ratio of dicyandiamide to cyanamide is from 0.1:10 to 10:1.

16. The process of claim 15 wherein the weight ratio of dicyandiamide to cyanamide is from 3:7 to 8:2.

17. The process of claim 1 wherein the weight ratio of dicyandiamide to cyanamide is 0.1:10 to 10:1.

* * * * *